(12) United States Patent
Cahill et al.

(10) Patent No.: US 6,252,207 B1
(45) Date of Patent: Jun. 26, 2001

(54) FUSER TEMPERATURE CONTROL SENSOR WHICH IS INSENSITIVE TO SURROUNDING AIR CURRENTS

(75) Inventors: David Francis Cahill, Rochester; James Van Orchard, Holley, both of NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/443,902

(22) Filed: Nov. 19, 1999

(51) Int. Cl.⁷ ..................................................... H05B 1/02
(52) U.S. Cl. ..................... 219/497; 219/216; 219/494; 219/501; 374/208
(58) Field of Search ..................................... 219/497, 494, 219/501, 505, 499, 491, 216; 374/208

(56) References Cited

U.S. PATENT DOCUMENTS

| | | | |
|---|---|---|---|
| 3,809,855 | * | 5/1974 | Neal ....................................... 219/216 |
| 3,968,343 | * | 7/1976 | Guran ..................................... 219/219 |
| 4,000,394 | * | 12/1976 | Bar-on ................................... 219/469 |
| 4,821,062 | * | 4/1989 | Katoh et al. ........................ 355/3 FU |
| 4,951,096 | * | 8/1990 | Derimiggio et al. ................. 219/216 |
| 5,281,793 | * | 1/1994 | Gavin et al. ........................... 219/216 |

* cited by examiner

Primary Examiner—Mark Paschall
(74) Attorney, Agent, or Firm—Lawrence P. Kessler

(57) ABSTRACT

A mechanism for controlling temperature of the at least one heated fuser element of a fuser, for a reproduction apparatus having a heater for the fuser element, operating at a desired temperature to permanently fix a marking particle image to a receiver member. The temperature controlling mechanism includes a temperature sensing element producing a signal corresponding to a sensed temperature of the fuser element. A temperature sensing face member defines a cavity for receiving the temperature sensing element therein. The temperature sensing face member has a surface configured to correspond to the configuration of the fusing element. A housing is provided having an interior chamber for receiving the temperature sensing face member at one end. Air is substantially trapped in the interior chamber adjacent to the temperature sensing face member. The housing is supported in a bracket for movement so as to engage the temperature sensing face member in contact with the fuser element to accurately sense the temperature thereof. A logic and control unit receives the signal from the temperature sensing element, and in response to receiving the signal, compares the signal to a reference temperature for the fuser element, and activates the heater for the fuser element based on such comparison.

22 Claims, 4 Drawing Sheets

FUSER TEMPERATURE CONTROL SENSOR WHICH IS INSENSITIVE TO SURROUNDING AIR CURRENTS

FIELD OF THE INVENTION

This invention relates in general to mechanisms for controlling the temperature of a fuser assembly for a reproduction apparatus, and more particularly to a reproduction apparatus fuser assembly temperature control mechanism sensor which is insensitive to air currents.

BACKGROUND OF THE INVENTION

In typical commercial electrographic reproduction apparatus (copier/duplicators, printers, or the like), a latent image charge pattern is formed on a uniformly charged charge-retentive or photoconductive member having dielectric characteristics (hereinafter referred to as the dielectric support member). Pigmented marking particles are attracted to the latent image charge pattern to develop such image on the dielectric support member. A receiver member, such as a sheet of paper, transparency or other medium, is then brought into contact with the dielectric support member, and an electric field applied to transfer the marking particle developed image to the receiver member from the dielectric support member. After transfer, the receiver member bearing the transferred image is transported away from the dielectric support member, and the image is fixed (fused) to the receiver member by heat and pressure to form a permanent reproduction thereon.

One type of fuser assembly, utilized in typical reproduction apparatus, includes at least one heated roller and at least one pressure roller in nip relation with the heated roller. The fuser assembly rollers are rotated to transport a receiver member, bearing a marking particle image, through the nip between the rollers. The pigmented marking particles of the transferred image on the surface of the receiver member soften and become tacky in the heat. Under the pressure, the softened tacky marking particles attach to each other and are partially imbibed into the interstices of the fibers at the surface of the receiver member. Accordingly, upon cooling, the marking particle image is permanently fixed to the receiver member.

During the operation of the reproduction apparatus, the fuser assembly operates in various modes having substantially different temperatures. That is for example, between job runs the heated fuser roller will be in a substantially equilibrium condition where there is at most only a small temperature gradient between the outer surface of the fuser roller and the inner core. Then when the job run begins energy (heat) is removed from the fuser roller to the reproductions being fused. As a result, the temperature at the outer surface of the fuser roller droops very quickly. Since the temperature droops substantially from the desired optimum operating setpoint temperature, the logic and control for the reproduction apparatus must turn on the fuser heating device to bring the fuser roller up to its desired operating temperature. However, depending upon the thickness of the fuser roller, there is a time lag until the fuser roller surface receives enough energy to get back to the desired optimum fusing temperature. Furthermore, due to the time lag, the fuser roller may receive a quantity of energy in bringing the roller surface up to the desired operating temperature which will cause an overshoot such that the surface temperature exceeds the desired operating temperature. During the time lag, the droop, or overshoot, in surface temperature of the fusing roller may cause inferior fusing quality.

In order to maintain the fuser roller temperature as close as practical to the desired operating temperature, a control mechanism including a temperature control sensor is provided to send signals that are representative of the fuser roller's surface temperature, to the logic and control unit for the reproduction apparatus. The temperature signal is processed by the logic and control unit, and if the temperature is above or below the set optimum operating value, the logic and control unit changes the available power sent to the fuser roller heater to adjust the fuser roller temperature. A good temperature control sensor mechanism must operate repeatably from sensor to sensor, must be accurate, and must exhibit a fast response. It has been now been determined that the air flow surrounding the temperature sensor has an adverse effect on the operation of the sensor.

SUMMARY OF THE INVENTION

In view of the above, this invention is directed to a mechanism for controlling temperature of the at least one heated fuser element of a fuser, for a reproduction apparatus having a heater for the fuser element, operating at a desired temperature to permanently fix a marking particle image to a receiver member. The temperature controlling mechanism includes a temperature sensing element producing a signal corresponding to a sensed temperature of the fuser element. A temperature sensing face member defines a cavity for receiving the temperature sensing element therein. The temperature sensing face member has a surface configured to correspond to the configuration of the fusing element. A housing is provided having an interior chamber for receiving the temperature sensing face member at one end. Air is substantially trapped in the interior chamber adjacent to the temperature sensing face member. The housing is supported in a bracket for movement so as to engage the temperature sensing face member in contact with the fuser element to accurately sense the temperature thereof. A logic and control unit receives the signal from the temperature sensing element, and in response to receiving the signal, compares the signal to a reference temperature for the fuser element, and activates the heater for the fuser element based on such comparison.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
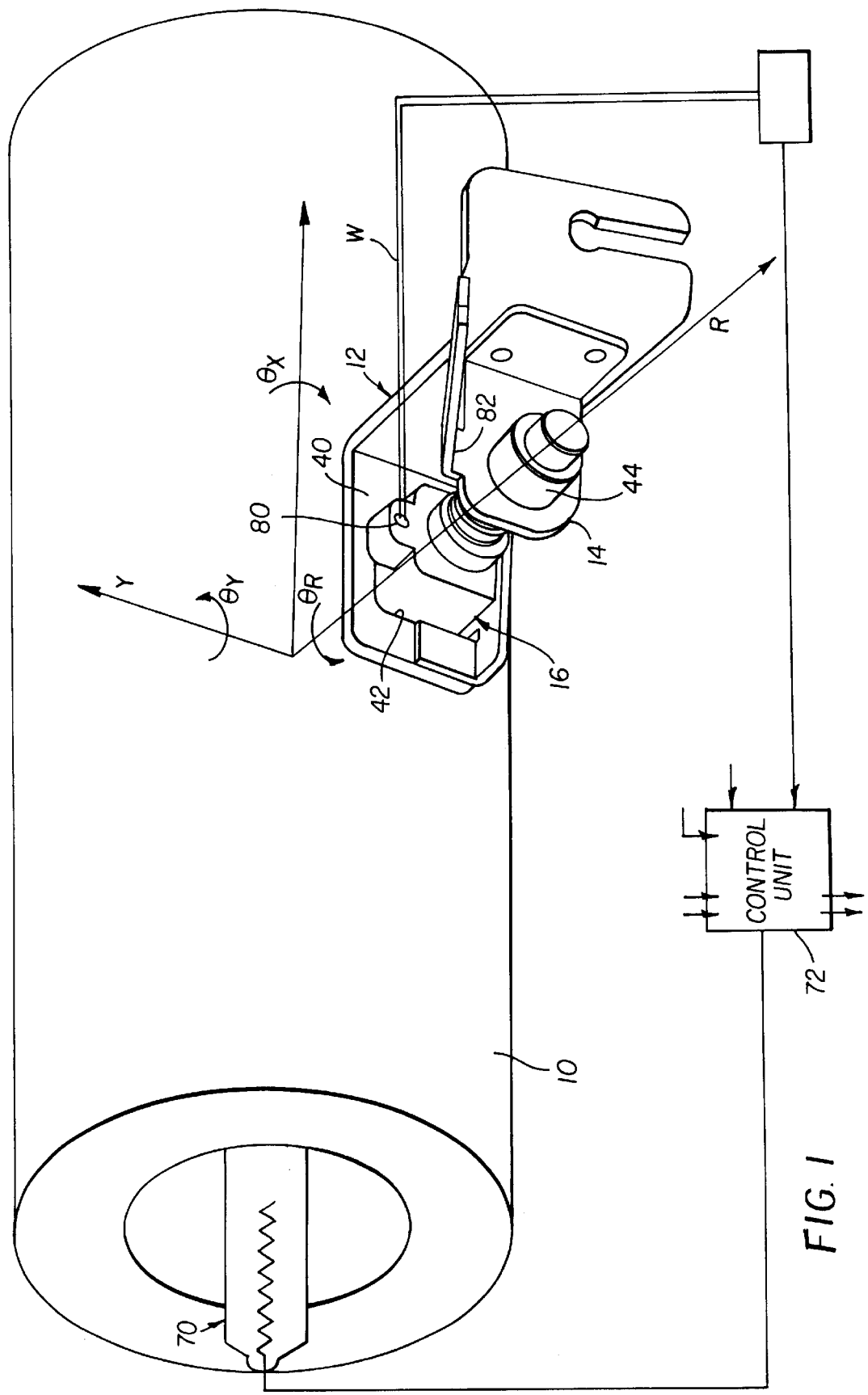
FIG. 1 is a view, in perspective, of a potion of a fuser assembly for a reproduction apparatus, with portions broken away or removed to facilitate viewing, the fuser assembly having a temperature control sensing mechanism according to this invention.
Figure 2:
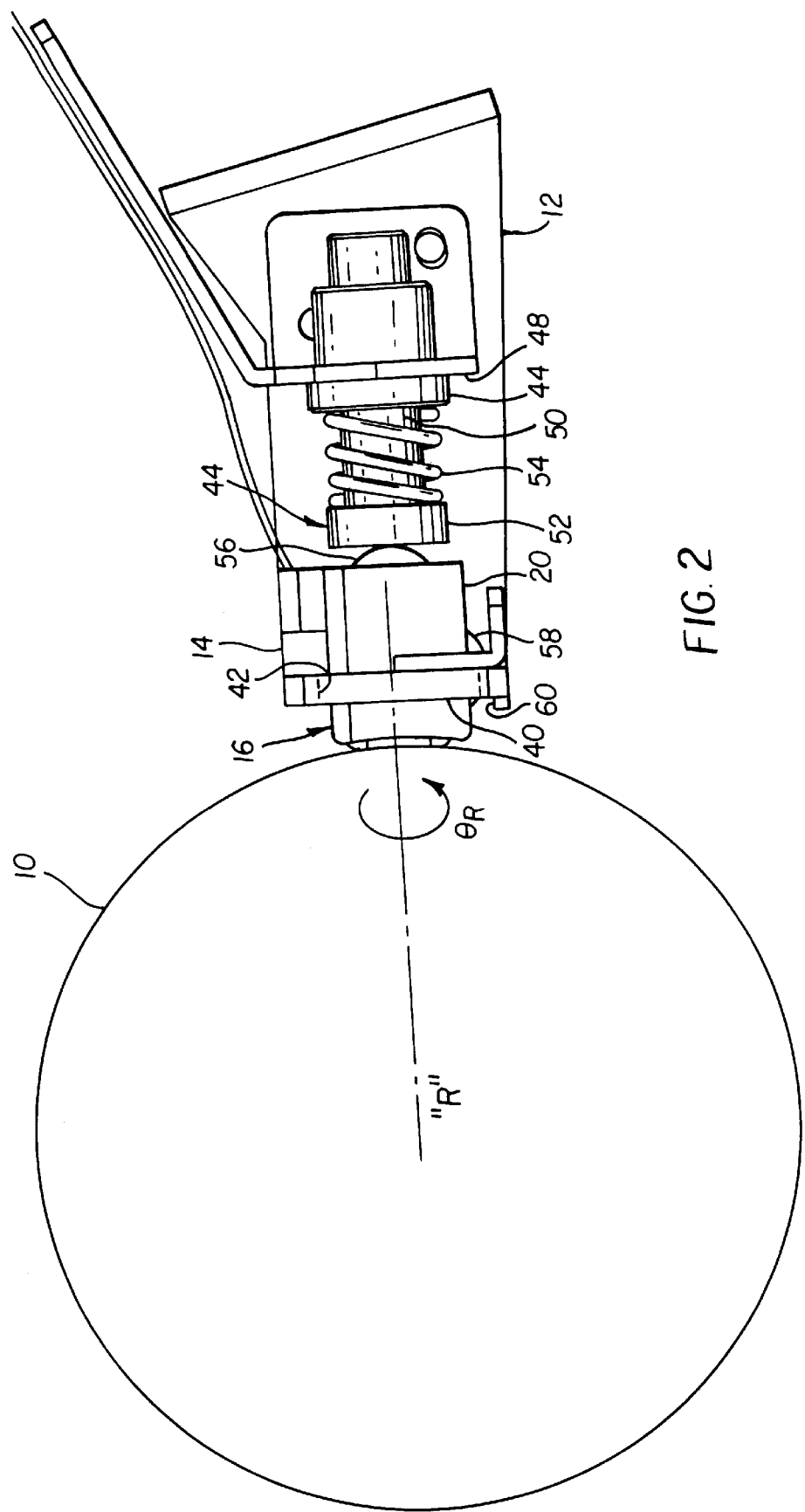
FIG. 2 is a side elevational view of the potion of a fuser assembly having the temperature control sensing mechanism as shown in FIG. 1.

Referring now to the accompanying drawings, FIGS. 1 and 2 show a roller of an exemplary fuser assembly 10 having a temperature control sensing mechanism, designated generally by the numeral 12, for sensing the temperature of the fuser roller surface. The fuser assembly is for the purpose of permanently fixing a marking particle image to a receiver member in a reproduction apparatus. While the fuser assembly 10 is shown as having a heated fuser roller, it is understood that the temperature control sensing mechanism according to this invention could be employed with other types of fuser assembly fixing elements, such as for example belt or web type fuser elements.

The temperature control sensing mechanism 12, according to this invention, includes a support bracket 14, attached by any suitable fasteners to a frame member (not shown) of the reproduction apparatus. The bracket 14 is positioned so as to generally locate a temperature sensor 16 in an operative sensing relation with the surface of the roller of the fuser assembly 10. The temperature sensor 16 includes a housing 20, a temperature sensor face 28, and a temperature sensing element 36.

Figure 3:
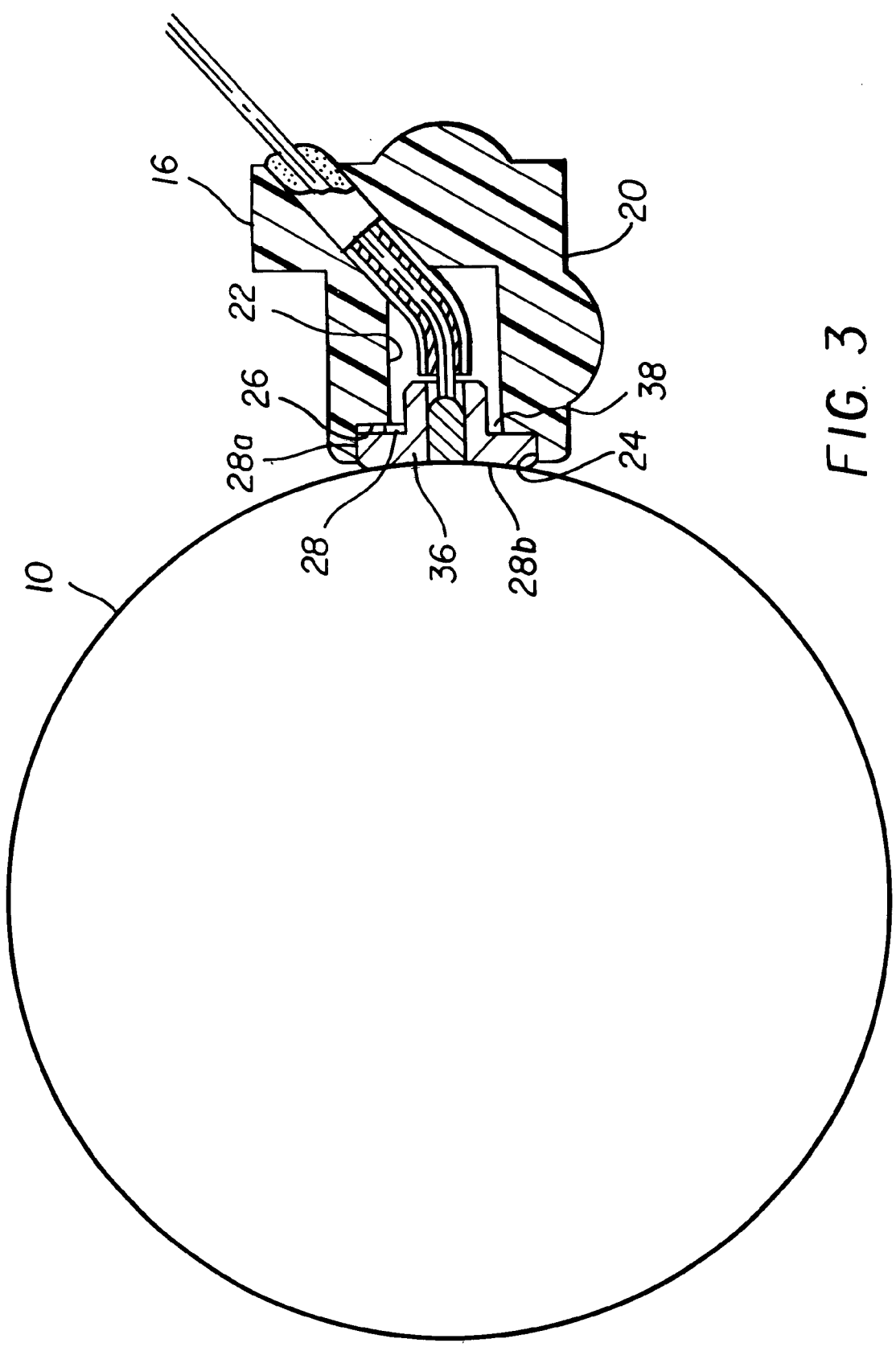
FIG. 3 is a side elevational view of the potion of a fuser assembly having the temperature control sensing mechanism as shown in FIG. 1, with the temperature sensor in cross-section.
Figure 4:
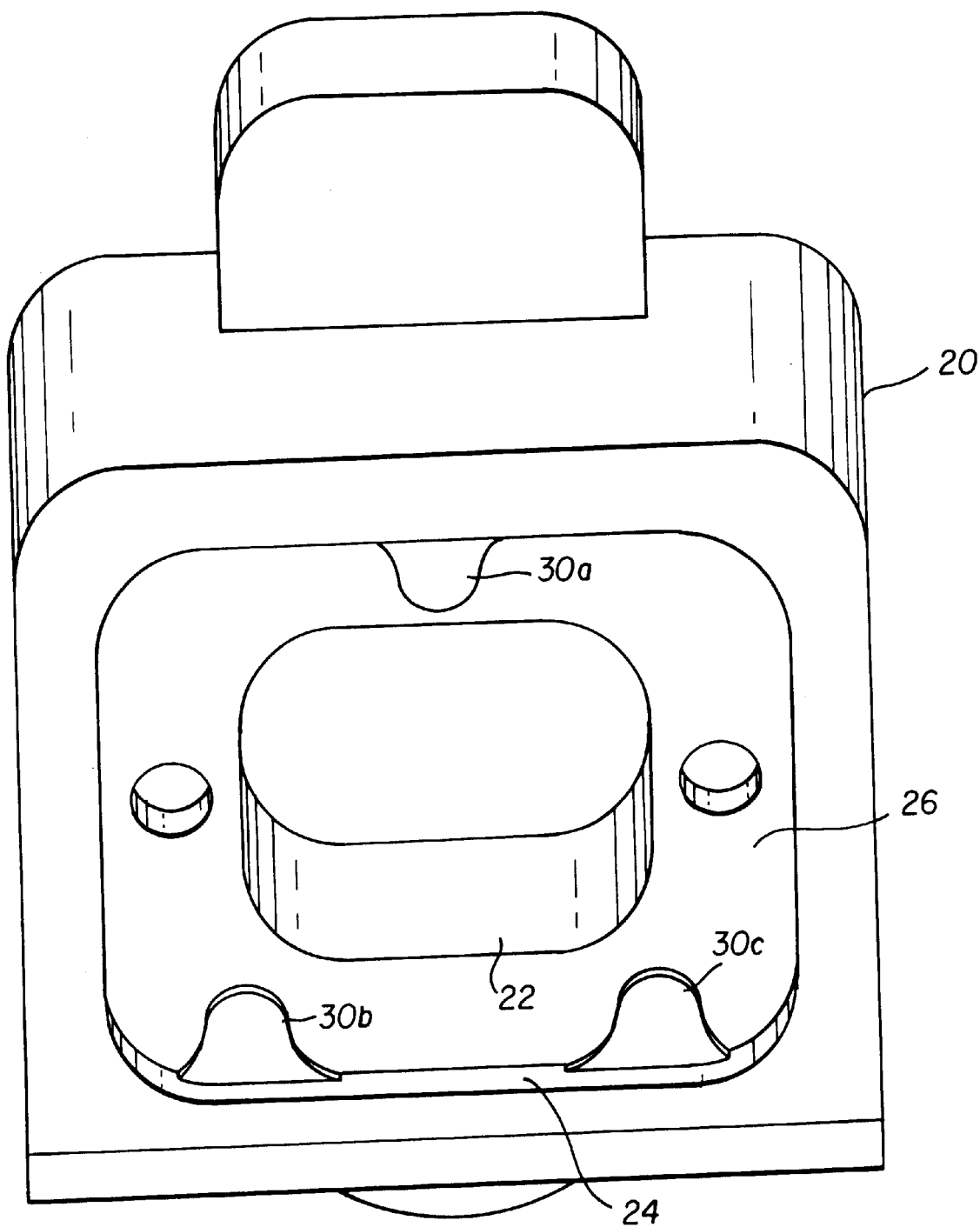
FIG. 4 is a view, in perspective, of the mount for the temperature sensor of the temperature control sensing mechanism as shown in FIG. 1.

For the temperature sensor 16, the housing 20 is made of a thermally insulative material, such as plastic for example. The structural configuration for the housing 20 is such that the housing defines an internal chamber 22 and an enlarged annular step 24 forming a shoulder 26 therebetween (see FIGS. 3 and 4). The temperature sensor face 28 is made of a thermally conductive material, such as aluminum copper, or stainless steel for example. The structural configuration for the temperature sensor face 28 is such that the temperature sensor face has a circumferential peripheral surface 28a corresponding to the annular step 24 to be received therein to substantially close one end of the chamber 22. Offset features 30a–30c are formed on the annular step and extend into the shoulder 26. As such, the features serve to prevent the sensor face 28 from engaging the shoulder 26 when the sensor face is received in the annular step 24. The sensor face 28 will accordingly be properly spaced from the shoulder 26 to allow a limited air flow to the housing internal chamber 22, and provide minimum contact between the thermally conductive sensor face and the insulative housing 20.

Further, the peripheral surface 28b of the temperature sensor face 28, facing the roller of the fuser assembly 10, has a radius of curvature which is slightly greater than that of the fuser roller whose temperature is being measured. This maximizes the area of contact of the sensor face 28 with the roller to improve heat transfer, and thus reduce the tendency for air to get between the sensor face and the roller. Moreover, the relative thickness of the conductive sensor face 28 reduces sensitivities to any angular misalignments in the R direction (see FIGS. 2 and 3) by reducing sensor face temperature gradients. The temperature sensing element 36 is, for example, a resistive temperature device (RTD), thermistor, or thermocouple. It will produce a signal corresponding to the temperature sensed thereby. The sensor face 28 has a cavity 38, communicating with the housing interior chamber 22, for receiving the temperature sensing element 36. The cavity 38 in the sensor face is deeper and greater in diameter that the sensing element 36. Thus when the sensing element 36 is potted in the cavity 38 with conductive epoxy, a good heat path is formed from the sensor face 28 to the sensing element.

The signal transmission wires W from the sensing element 36 exit the housing 20 through a suitable opening 80 in the housing wall communicating with the interior chamber 22. The opening 80 is sealed with a high temperature epoxy for securing the wires relative to the housing 20. The wires W are also secured, downstream of the housing 20, to an extension arm 82, connected to an arm of the bracket 14. The connection of the wires W to the extension arm 82 assures that no strains on the wires, from downstream of the temperature sensing mechanism 12, are imparted to the connection of the wires to the housing 20.

It should also be noted that due to the described arrangement of the sensor face 28 in the annular step 24 of the housing 20, it is provided that air flow to the housing interior chamber 22 is substantially prevented. This establishes good thermal insulation by trapping substantially stagnant air in the interior chamber 22 behind the conductive sensor face 28 (see FIG. 3). The housing 20 therefore isolates the temperature sensing element 36 from air flow in the vicinity of the temperature sensor 16 which may produce random environmental temperature variations that can adversely effect the temperature reading of the sensor.

The housing 20 of the temperature sensor 16 is retained in the bracket 14 so as to be properly, repeatably and accurately seated with the sensor face 28 in operative contact with the roller of the fuser assembly 10. The bracket 14 has a first arm 40 in which an opening 42 is defined. The housing 20 of the temperature sensor 16 extends through the opening 42. The opening is large enough, with respect to the housing 20, such that the housing 20 has a degree of movement along three orthogonal axes (X, Y, and R) and rotation about such orthogonal axes ($\theta_x, \theta_y$, and $\theta_R$).

The housing 20 is urged in the direction (along axis R) toward the roller of the fuser assembly 10 by a loading mechanism 44. The loading mechanism 44 includes a body 46 secured in a second arm 48 of the bracket 14. The body 46 serves as a slide/guide for a plunger 50 having an actuator end 52. An urging mechanism, such as a coil spring 54, is located so as to urge the actuator end 52 of the plunger into engagement with the housing 20. The housing 20 is in turn urged in the direction (along axis R) through the opening 42 in the bracket first arm 42 to maintain the temperature sensor face 28 in intimate contact with the roller of the fuser assembly 10.

The housing 20 also includes spherical features 56 and 58. The spherical feature 56 is engaged by the actuator end 52 of the plunger 50, while the spherical feature 58 rides on a support surface 60 of the bracket 14. Due to the loading of the temperature sensor 16 by the plunger 50 through the spherical feature 56, and the support of the temperature sensor 16 through the spherical feature 58, the temperature sensing face 28 in the annular step 24 of the housing 20 is substantially free to track precisely with the roller of the fuser assembly 10. That is, there are no constraining forces on the housing 20 which would limit the substantially free movement thereof so as to prevent the housing (and thus the temperature sensing face 28) from precisely following the surface of the roller of the fuser assembly 10. Accordingly, any untoward movement of the surface of the roller of the fuser assembly 10 along, or about, axes X, Y, or R can be accurately followed by the temperature sensing face 28, and thus the housing 20 of the temperature sensor 16 to ensure that the temperature sensor tracks properly with the roller of the fuser assembly.

In operation, the roller of the fuser assembly 10 is heated by a suitable energy source, such as an exemplary heat lamp 70 (shown in FIG. 1). As such, the surface of the fuser roller is maintained at selected reference setpoint operating temperatures during the operating cycle of the reproduction apparatus. The particular reference setpoint operating temperatures for various fuser assembly conditions during the operating cycle is stored in the logic and control unit 72 of the reproduction apparatus. The logic and control unit 72 receives signals, from reproduction apparatus processing stations and location sensors about the reproduction processing path, fed as input information to the logic and control unit 72 including a microprocessor, for example. Based on such signals and a suitable program for the microprocessor, the logic and control unit produces signals to control the timing operation of the various process stations for carrying out the reproduction process. The production of a program for a number of commercially available microprocessors, which are suitable for use with the invention, is a conventional skill well understood in the art. The particular details of any such program would, of course, depend on the architecture of the designated microprocessor. Accordingly, the logic and control unit 72 will provide appropriate activation signals for the heat lamp 70 to control the temperature of the surface of the roller of the fuser assembly 10.

As noted above, in order to enable the logic and control unit 72 properly activate the heat lamp 70 for accurate fuser roller surface temperature control, the actual temperature of the fuser roller surface must be precisely determined and provided on a real time basis to the logic and control unit as a reference to indicate the need to activate the heat lamp. With the described temperature sensor 16 maintained in optimum heat transfer relation with the roller of the fuser assembly 10, the temperature of the surface of the fuser roller is accurately detected. The construction of the temperature sensor 16 assure maximum temperature sensing accuracy, with a minimum adverse effect on the sensing function such as by air flow in the vicinity of the temperature sensor which may produce random environmental temperature variations. The signal from the sensor element 36 corresponding to the temperature of the surface of the roller of the fuser assembly is fed as an input signal to the logic and control unit 72. In response to receiving this signal, the signal is compared with the reference temperature, and when there is a deviation, based on the comparison, accurate activation of the heat lamp 70 is determined.

The invention has been described in detail with particular reference to certain preferred embodiments thereof, but it will be understood that variations and modifications can be effected within the spirit and scope of the invention.

What is claimed is:

1. A fuser, for a reproduction apparatus, having at least one fuser element operating at a desired temperature to permanently fix a marking particle image to a receiver member, a heater for said fuser element, and a mechanism for controlling temperature of said at least one heated fuser element, said temperature controlling mechanism comprising:

a temperature sensing element producing a signal corresponding to a sensed temperature of said fuser element;

a temperature sensing face member, including a surface configured to correspond to the configuration of said fusing element, said temperature sensing face member receiving said temperature sensing element in a manner such that said temperature sensing element is in direct thermal contact with said fuser element;

a thermally insulative housing receiving said temperature sensing face member, and wherein air is trapped within said housing adjacent to said temperature sensing face member;

a bracket for supporting said housing for movement so as to engage said temperature sensing face member in contact with said fuser element to accurately sense the temperature thereof; and a logic and control unit receiving said signal from said temperature sensing element, and in response to receiving said signal, comparing said signal to a reference temperature for said fuser element, and activating said heater for said fuser element based on such comparison.

2. The temperature controlling mechanism according to claim 1, wherein said temperature sensing element is a resistive temperature device.

3. The temperature controlling mechanism according to claim 1, wherein said temperature-sensing element is a thermister.

4. The temperature controlling mechanism according to claim 1, wherein said temperature-sensing element is a thermocouple.

5. The temperature controlling mechanism according to claim 1, wherein said temperature sensing face member is formed of thermally conductive material.

6. The temperature controlling mechanism according to claim 5, wherein said thermally conductive temperature sensing face member defines a cavity for said temperature sensing element.

7. The temperature controlling mechanism according to claim 6, wherein said cavity of said thermally conductive temperature sensing face member is deeper and greater in diameter than said temperature sensing element.

8. The temperature controlling mechanism according to claim 7, wherein said temperature sensing element is potted in said cavity with conductive epoxy, whereby a good heat path is formed from said temperature sensor face member to said temperature sensing element.

9. The temperature controlling mechanism according to claim 1, wherein said insulating housing defines an interior chamber for receiving said temperature sensing face member to substantially close one end of said chamber and trap air therein, whereby good thermal insulation is established by the trapped stagnant air in said interior chamber behind the conductive temperature sensor face member so that said temperature sensing element is isolated from air flow in the vicinity of said temperature sensor mechanism which may produce random environmental temperature variations that can adversely effect the temperature reading of said temperature sensor element.

10. The temperature controlling mechanism according to claim 1, wherein said bracket supports said housing for movement along, and rotation about orthogonal axes so as maintain said temperature sensing face member in intimate contact with said fuser element.

11. The temperature controlling mechanism according to claim 10, wherein said bracket includes a first arm defining an opening for receiving said housing therein, said opening being of a dimension relative to said housing so as to enable said housing to substantially freely move in a direction along and rotate about said orthogonal axes in said opening.

12. The temperature controlling mechanism according to claim 11, wherein said bracket further includes a second arm supporting a loading mechanism for urging said housing in a direction toward said roller of said fuser assembly.

13. The temperature controlling mechanism according to claim 12, wherein said loading mechanism includes a plunger having an actuator end, a body secured in said second arm, said body serving as a slide/guide for said plunger, and an urging mechanism located so as to urge said actuator end of said plunger into engagement with said housing.

14. The temperature controlling mechanism according to claim 13, wherein said housing includes first and second spherical features, said first spherical feature being engaged by said actuator end of said plunger, and said second spherical feature riding on a support surface of said bracket to support said housing thereon, wherein due to the loading and support of said housing through said spherical features, said housing is substantially free to track precisely with said fuser element.

15. With a fuser, for a reproduction apparatus, having at least one fuser element operable at a set temperature to permanently fix a marking particle image to a receiver member, a heater for said fuser element, and a logic and control unit for activating said fuser element heater, a sensor mechanism for controlling temperature of said at least one fuser element, said temperature controlling sensor mechanism comprising:

- a temperature sensing element producing a signal corresponding to a sensed temperature of said fuser element for said logic and control unit;
- a temperature sensing face member, including a surface configured to contact said fusing element, said temperature sensing face member receiving said temperature sensing element in a manner such that said temperature sensing element is in direct thermal contact with said fuser element;
- a thermally insulative housing having an interior chamber for receiving said temperature sensing face member at one end and providing a source of stagnant air; and
- a bracket for supporting said housing for movement so as to engage maintain said temperature sensing face member in intimate contact with said fuser roller to accurately sense the temperature thereof.

16. The temperature controlling mechanism according to claim 15, wherein said temperature sensing element is selected from the group of a resistive temperature device, a thermister, or thermocouple.

17. The temperature controlling mechanism according to claim 15, wherein said temperature sensing face member is formed of thermally conductive material and defines a cavity for receiving said temperature sensing element therein.

18. The temperature controlling mechanism according to claim 17, wherein said cavity of said thermally conductive temperature sensing face member is deeper and greater in diameter than said temperature sensing element, such that when said temperature sensing element is potted in said cavity with conductive epoxy, a good heat path is formed from said temperature sensor face member to said temperature sensing element.

19. The temperature controlling mechanism according to claim 15, wherein said insulating housing defines an interior chamber for receiving said temperature sensing face member to substantially close one end of said chamber and trap air therein, whereby good thermal insulation is established by the trapped substantially stagnant air in said interior chamber behind the conductive temperature sensor face member so that said temperature sensing element is isolated from air flow in the vicinity of said temperature sensor mechanism which may produce random environmental temperature variations that can adversely effect the temperature reading of said temperature sensor element.

20. The temperature controlling mechanism according to claim 15, wherein said bracket includes a first arm defining an opening for receiving said housing therein, said opening being of a dimension relative to said housing so as to enable said housing to substantially freely move in a direction along and rotate about said orthogonal axes in said opening, and a second arm supporting a loading mechanism for urging said housing in a direction toward said roller of said fuser assembly.

21. The temperature controlling mechanism according to claim 20, wherein said loading mechanism includes a plunger having an actuator end, a body secured in said second arm, said body serving as a slide/guide for said plunger, and an urging mechanism located so as to urge said actuator end of said plunger into engagement with said housing.

22. The temperature controlling mechanism according to claim 21, wherein said housing includes first and second spherical features, said first spherical feature being engaged by said actuator end of said plunger, and said second spherical feature riding on a support surface of said bracket to support said housing thereon, wherein due to the loading and support of said housing through said spherical features, said housing is substantially free to track precisely with said fuser element.

* * * * *